Patented Aug. 4, 1931

1,817,333

UNITED STATES PATENT OFFICE

FREDERICK W. ZONS, OF NEW YORK, N. Y., ASSIGNOR TO AMERICAN NEON LIGHT CORPORATION, OF NEW YORK, N. Y., A CORPORATION OF DELAWARE

METHOD OF PREPARING LUMINESCENT TUBES

No Drawing.   Application filed February 13, 1929. Serial No. 339,735.

This invention relates to luminescent tubes, and more particularly, methods and means of cleaning up deleterious gases therein.

In the manufacture of luminescent tubes and particularly in the manufacture of such tubes containing a filling of neon gas, it is the present practice to take extreme precautions to degasify the electrodes and the walls of the glass tubing employed therein. Many manufacturers believe that it is necessary during the manufacture of neon tubes to heat the electrodes and the glass walls to drive out the gases occluded therein.

I have discovered, however, that if proper precautions are taken, it is not essential that such rigorous methods of degasifying the electrodes and the walls of the tube need be carried out.

However, it sometimes occurs during the manufacture and use of tubes that a certain quantity of hydrogen and oxygen is unavoidably driven out from the glass walls or from the electrode. This occurs more particularly during the scavenging of the tube during manufacture, at which time the electrodes are likely to become heated but it may and frequently does occur during operation of the finished tube. The quantity of hydrogen and oxygen driven out in this manner is indeed quite minute and while it may not be sufficient to cause discoloration of the gas in the finished tube, it, nevertheless, has a very deleterious effect in other ways. This deleterious effect is evidenced by the formation of a deposit of an apparently metallic nature on the inner walls of the glass tubing, beginning even during the process of manufacture of the tube and continuing throughout the life of the same, the result being that the light of the tube may become greatly obscured and other difficulties result.

The probable reason for this is that the hydrogen and oxygen first combine to form water vapor. This water vapor then attacks the metal of the electrodes, the oxygen combining therewith and the hydrogen being set free. Assuming the metal of the electrode to be iron, the oxygen from the water vapor forms an iron oxide when the electrode becomes heated. The hydrogen thus set free thereupon combines with the oxygen in the iron oxide of the hot electrode and the metal from the reduced oxide is carried as a black coating to the glass walls of the tube. Hydrogen and oxygen, having thus once more combined as water vapor, once more also attack the metal of the electrode thus forming a complete cycle, which is repeated over and over again with a corresponding increase of deposit upon the walls of the tubing. This deposit or coating not only obscures the light from the luminescent tube but its presence is symptomatic of conditions within the tube that result usually in a shortening of its life.

It is the object of the present invention to provide means by which water vapor which may be unavoidably formed within the tube is rendered harmless. I have found that there is frequently an excess of hydrogen over the oxygen in the gases released within the tube. Hydrogen in its free state, however, is very difficult to dispose of, but when it is combined with oxygen in the form of water vapor it can easily be removed by the means hereinafter set forth.

I first, therefore, provide sufficient additional oxygen within the tube to combine with all the free hydrogen, to form an excess of water vapor the very gas which is most harmful. This is accomplished in the following manner. I first make an aqueous solution of materials, which, on being heated, will give off oxygen or oxidizing substances and preferably I use nitrates, such as potassium nitrate which will give off oxygen at low temperatures such as 200 or 300° C. A small quantity of this solution is then painted or otherwise coated upon the electrode and allowed to dry there. The electrode is then mounted in the electrode chamber of a luminescent tube and a small quantity of phosporous pentoxide ($P_2O_5$) is placed in some suitable position within the electrode chamber. The phosphorus pentoxide may, for instance, be placed upon the inside of the glass of the electrode chamber itself.

The scavenging process carried out during the manufacture results in a considerable heat within the tube and a considerable volume of hydrogen, oxygen and nitrogen are driven out of the glass walls. The potassium nitrate on the electrode will give off under the temperatures attained sufficient oxygen to combine with the free hydrogen to form water vapor and this is then taken up with great rapidity by the phosphorus pentoxide within the electrode chamber. The water vapor is thus prevented from attacking the electrode and effectively prevented from forming a deposit upon the glass of the tube.

I may further combine the oxidizing substances of the present invention with the electron emitting substances described and claimed in my copending application Serial No. 338,617. In that application I describe an electrode having a coating of electron emitting substances such as the salts of the alkaline earth metals. I may take for example a solution or suspension of barium salts and mix therewith a solution or suspension of the oxidizing substances of the present invention, preferably using with barium salts as an electron emitter, barium nitrate as an oxidizing agent. This may then be coated upon the electrode in the manner described herein. By thus combining the electron emitter with the oxidizing agent as a coating on the electrode (the water vapor absorbent also being present, of course) I secure a double advantage in that I am enabled to lower the internal resistance of the tube and also to prevent the harmful effects of water vapor.

It will thus be evident that without departing from the spirit or scope of this invention, other substances may be used to provide oxygen than potassium nitrate as above mentioned, and that these substances may be affixed to the electrode by other means than painting thereon in the manner described. They may, indeed, be coated on the electrodes in any manner without departing from this invention. Also other substances having a strong affinity for water vapor may be used than the phosphorus pentoxide above mentioned. The invention consists essentially in fact, in the method and means of providing sufficient oxygen within a luminescent tube to combine with the free hydrogen that may be present therein, to form water vapor, and then to provide means for absorbing this water vapor, to prevent it from attacking the metal of the electrode. It will be observed that while neither the hydrogen nor oxygen in their free states and in the small quantities in which they exist are of any particular harm, the presence of hydrogen is always potentially harmful because of the readiness with which it will combine with oxygen to form water vapor.

Accordingly, I claim:—

1. In a luminescent tube, an electrode having a coating of an oxygen compound of the alkaline earth metals which delivers oxygen when heated.

2. In a luminescent tube, an electrode chamber and an electrode mounted therein; said electrode having a coating of substances adapted to give off oxygen when heated, and said chamber containing a quantity of a substance having an affinity for water vapor.

3. In a luminescent tube, an electrode chamber and an electrode mounted therein; said electrode having a coating of substances adapted to give off oxygen when heated, and said chamber containing a quantity of phosphorus pentoxide.

4. In a luminescent tube, an electrode chamber and an electrode mounted therein; said electrode having a coating of electron emitting substances mixed with oxidizing substances; and said chamber containing a quantity of a substance having an affinity for water vapor.

5. The process of clean up of oxygen and hydrogen in a luminescent tube which comprises first generating additional oxygen within said tube in quantity sufficient to combine with all the free hydrogen therein as water vapor; and placing within said tube a quantity of a material having a strong affinity for water vapor.

6. The process of clean up of oxygen and hydrogen in a luminescent tube which comprises coating the electrodes of said tube with a substance adapted when heated, to give off additional oxygen in quantity sufficient to combine with all the free hydrogen as water vapor and placing within said tube a quantity of a material having a strong affinity for water vapor.

7. The process of clean up of oxygen and hydrogen in a luminescent tube which comprises coating the electrodes of said tube with nitrates of the alkaline earth metals and placing within said tube a quantity of phosphorus pentoxide.

8. The process of preparing a luminescent tube which comprises the placing of electron emitting materials mixed with materials adapted to give off oxygen when heated in a position within said tube where said electron emitting materials will be activated by passage of current through the electrodes and placing also within said tube a quantity of a water vapor absorbent material.

9. The process of preparing a luminescent tube which comprises the placing of barium salts mixed with barium nitrates in a position within said tube where said barium salts will be activated on passage of current through said electrodes and placing also within said tube a quantity of phosphorus pentoxide.

In witness whereof, I have hereunto subscribed my name this 4th day of February, 1929.

FREDERICK W. ZONS.